(12) United States Patent
Kawakami et al.

(10) Patent No.: US 9,586,189 B2
(45) Date of Patent: Mar. 7, 2017

(54) CATALYST LOADING DEVICE AND CATALYST LOADING METHOD

(71) Applicant: SOFTARD INDUSTRIES CO., LTD., Tokyo (JP)

(72) Inventors: Katsuhiko Kawakami, Tokyo (JP); Masanao Kato, Tokyo (JP); Yasuo Uchida, Tokyo (JP)

(73) Assignee: SOFT AND INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 15/041,091

(22) Filed: Feb. 11, 2016

(65) Prior Publication Data

US 2016/0236164 A1    Aug. 18, 2016

(30) Foreign Application Priority Data

Feb. 12, 2015  (JP) .................................. 2015-025575

(51) Int. Cl.
*B65B 1/04* (2006.01)
*B01J 8/00* (2006.01)
*B01J 8/02* (2006.01)

(52) U.S. Cl.
CPC ............ *B01J 8/0045* (2013.01); *B01J 8/002* (2013.01); *B01J 8/003* (2013.01); *B01J 8/006* (2013.01); *B01J 8/0035* (2013.01); *B01J 8/0055* (2013.01); *B01J 8/025* (2013.01); *B01J 2208/00752* (2013.01); *B01J 2208/00769* (2013.01)

(58) Field of Classification Search
CPC  B01J 8/0045; B01J 8/003; B01J 2208/00752; B01J 8/002; B01J 8/0035; B01J 8/0055; B01J 8/006; B01J 8/025; B01J 2208/00769
See application file for complete search history.

(56) References Cited

U.S. PATENT DOCUMENTS 5,950,694 A * 9/1999 Jama ........................ B01J 8/002
                                                                141/285
2008/0216918 A1* 9/2008 Comardo ................. B01J 8/003
                                                                141/286

FOREIGN PATENT DOCUMENTS

JP          8-281094        10/1996

* cited by examiner

*Primary Examiner* — Jason K Niesz
(74) *Attorney, Agent, or Firm* — Rankin, Hill & Clark LLP (57) ABSTRACT

A catalyst loading device configured to rotationally spread a catalyst in a reactor includes: a rotor disposed in the reactor and configured to be rotated; a feeder configured to feed the catalyst to the rotor; and an air delivery unit configured to generate an air flow along the catalyst fed to the rotor. The rotor is disposed to a lower end of a cylinder that is concentric with a rotary shaft of the rotor. The cylinder includes: a delivery air feed pipe configured to generate the air flow of delivery air; and a throttle mechanism configured to regulate the delivery air.

8 Claims, 5 Drawing Sheets

CATALYST LOADING DEVICE AND CATALYST LOADING METHOD

The entire disclosure of Japanese Patent Application No. 2015-025575 filed Feb. 12, 2015 is expressly incorporated by reference herein.

TECHNICAL FIELD

The present invention relates to a catalyst loading device configured to load a catalyst to a reactor in petroleum refining equipment, chemical industrial equipment and the like, and a catalyst loading method of loading the catalyst to the reactor.

BACKGROUND ART

Various catalysts are used for promoting chemical reactions in petroleum refining equipment, chemical industrial equipment and the like. For instance, a catalyst is formulated in granules and loaded inside a reactor in which a material fluid is circulated.

In order to load the catalyst, a catalyst loading device of a rotary spread type is used (Patent Literature 1: JP-A-8-281094).

The catalyst loading device of Patent Literature 1 includes a spreader to be introduced into the reactor from an upper opening thereof.

The spreader includes a dispersion rotor at a lower end of a cylindrical shaft. The dispersion rotor is configured to flow out a catalyst fed in the shaft. In this arrangement, by rotating the spreader, the catalyst flowed out from the dispersion rotor can be scattered to near an outer circumference of the reactor to be broadly dispersed in the reactor.

With use of such a catalyst loading device, the catalyst can be efficiently loaded into the reactor under suitable conditions.

The above-described catalyst granules are partially cut or broken by mutual collision and the like in delivery to generate catalyst powders. In the above spreader, in addition to mutual collision of the catalyst granules when declining in the cylindrical shaft, the catalyst granules strongly hit each other when spread from the dispersion rotor, so that catalyst powders are generated.

Such catalyst powders are loaded together with the original catalyst granules and accumulated between the catalyst granules. Consequently, even though the catalyst is loaded in the reactor under suitable conditions, the catalyst powders are likely to be clogged in a gap between the catalyst granules to cause disadvantages such as generation of a differential pressure and generation of an uneven flow.

Moreover, the catalyst powders may leak outside the reactor or the catalyst loading device, which entails an environmental problem.

Further, a worker working in the reactor may suffer a health problem, so that a strict countermeasure for protecting the worker is required.

SUMMARY OF THE INVENTION

An object of the invention is to provide a catalyst loading device configured to load a catalyst by rotary spread and avoid influence of catalyst powders, and a catalyst loading method.

According to an aspect of the invention, a catalyst loading device configured to rotationally spread a catalyst in a reactor includes: a rotor disposed in the reactor and configured to be rotated; a feeder configured to feed the catalyst to the rotor; and an air delivery unit configured to generate an air flow along the catalyst fed to the rotor.

In the above aspect of the invention, the catalyst is fed from the feeder to the rotor and rotationally spread from the rotor inside the reactor. At this time, the air flow is formed along the catalyst fed from the rotor by the air delivery unit, so that the catalyst is delivered in the air flow to the rotor and discharged together with the air flow into the reactor.

Accordingly, the delivery of the catalyst in the air flow can prevent mutual friction of the catalyst caused when only the catalyst is delivered and can prevent breakage of the catalyst and generation of catalyst powders caused by the mutual friction.

Thus, in the above arrangement, the influence by the catalyst powders is avoidable by inhibiting the generation of the catalyst powders.

In the above arrangement, the rotor is preferably disposed to a lower end of a cylinder that is concentric with a rotary shaft of the rotor, and the cylinder preferably includes: a delivery air feed pipe configured to generate the air flow of delivery air; and a throttle mechanism configured to regulate the delivery air fed from the delivery air feed pipe.

With this arrangement, such suitable delivery conditions of the catalyst as not generating the catalyst powders can be set by regulating the flow amount, flow speed or pressure of the air flow for air-delivering the catalyst.

In the above arrangement, the cylinder preferably includes an upper cylinder and a lower cylinder that are disposed concentrically with each other and are partially superposed on each other, the cylinder preferably includes a slit formed between a step formed on one of the upper cylinder and the lower cylinder and an edge of the other of the upper cylinder and the lower cylinder, and the throttle mechanism preferably includes the slit and configured to adjust an opening degree of the slit by relatively moving the upper cylinder and the lower cylinder in respective shaft directions.

With this arrangement, the opening degree of the slit between the superposed cylinders can be adjusted with a simple structure by relatively moving the cylinders in the respective shaft directions.

In the above arrangement, the rotor is preferably shaped to have a radius from the rotary shaft to an outer circumference differing depending on directions starting from the rotary shaft.

With this arrangement, the radius at each portion of the rotor differs and a circumferential speed at each portion of the rotor differs, so that a difference between flying distances in the radius directions of the catalyst spread from each portion becomes large. Consequently, the catalyst spread from each portion of the rotor can be dispersed in a broad range inside the reactor, so that a less deviated and even spread condition of the catalyst can be obtained.

In the above arrangement, the rotor preferably includes: a bottom plate; partitions vertically formed on an upper surface of the bottom plate and are continuous from a central part of the bottom plate to an outer circumference thereof; and a rotor cover that covers upper edges of the partitions.

With this arrangement, the fed catalyst is guided from the central part of the rotor to the outer circumference thereof by the bottom plate and the partitions of the rotor, so that the catalyst can be spread from each portion on the outer circumference of the rotor. In this arrangement, since the upper edges of the partitions are covered with the rotor cover, a cylindrical catalyst passage is defined by the bottom plate and the partitions of the rotor and the rotor cover.

Accordingly, the air flow fed together with the catalyst does not dissipate, so that the catalyst can be securely air-delivered to the outer circumference of the rotor.

In the above arrangement, the feeder preferably includes a pinch valve configured to block a passage of the catalyst reaching the rotor, the pinch valve including a pair of balloons disposed to face each other.

With this arrangement, since feed and spread of the catalyst can be suspended or continued using the pinch valve and the pinch valve is in the form of balloons, even if the catalyst is trapped by the balloons when blocking the passage, the balloons are deformed to softly hold the catalyst and not break the catalyst, so that generation of the catalyst powders is preventable.

In the above arrangement, the feeder preferably includes a filter in the passage of the catalyst reaching the rotor, the filter preferably includes: a catalyst pipe through which the catalyst passes; an inner pipe disposed inside the catalyst pipe in a manner to be concentric with the catalyst pipe; and an outer pipe disposed outside the catalyst pipe in a manner to be concentric with the catalyst pipe, the catalyst pipe preferably includes a number of communication holes through which an inside of the catalyst pipe intercommunicates with an outside thereof, the inner pipe is preferably connected to a dedusting air feed pipe configured to feed dedusting air into an inside of the inner pipe and preferably includes a number of communication holes through which the inside of the inner pipe intercommunicates with an outside thereof, and the outer pipe is preferably connected to a dedusting air discharge pipe configured to discharge the dedusting air in an inside of the outer pipe to an outside of the outer pipe.

With this arrangement, when the dedusting air is fed from the dedusting air feed pipe into the inner pipe, the fed dedusting air enters the catalyst pipe through the communication holes of the inner pipe and further enters the outer pipe through the communication holes of the catalyst pipe to be discharged into the dedusting air discharge pipe.

Accordingly, in the filter, the catalyst is cleaned with the dedusting air entering the outer pipe through the inner pipe and the catalyst pipe by delivering the catalyst fed to the rotor to between the catalyst pipe and the inner pipe, so that the catalyst powders attached to the catalyst are discharged together with the dedusting air into the outer pipe and the dedusting air discharge pipe.

With such a filter, even when catalyst powders are attached to or mixed with the catalyst before being fed from the feeder, the catalyst powders are removable.

Thus, with the above arrangement, in addition to the prevention of breakage of the catalyst caused by the air delivery and the inhibition of generation of the catalyst powders, influence by the catalyst powders is avoidable by removing the catalyst powders attached to or mixed with the catalyst.

According to another aspect of the invention, a catalyst loading method for spreading a catalyst inside a reactor using a catalyst loading device of a rotary type includes: feeding the catalyst into a rotor rotating in the reactor; and generating an air flow along the catalyst fed to the rotor to air-deliver the catalyst.

According to the above aspect of the invention, the same advantages as described above on the catalyst loading device can be obtained.

According to the above aspects of the invention, a catalyst loading device configured to load a catalyst by rotary spread and avoid influence of catalyst powders and a catalyst loading method for loading a catalyst by rotary spread and avoiding influence of catalyst powders can be provided.

BRIEF DESCRIPTION OF DRAWING(S)

FIG. 1 is a diagram showing catalyst loading according to an exemplary embodiment of the invention.

FIG. 2 is a cross-sectional view showing a catalyst loading device according to the exemplary embodiment.

FIG. 3 is an enlarged cross-sectional view showing a spreader according to the exemplary embodiment.

FIG. 4 is a plan view showing a rotor according to the exemplary embodiment.

FIG. 5 is a plan view showing a rotor according to another exemplary embodiment of the invention.

DESCRIPTION OF EMBODIMENT(S)

Exemplary embodiment(s) of the invention will be described below with reference to the attached drawings.

As shown in FIG. 1, a catalyst 2 is loaded into an inside of a reactor 1. When the catalyst 2 is loaded into the reactor 1, a catalyst loading device 3 is introduced into the inside of the reactor 1 through an upper opening thereof.

As shown in FIG. 2, the catalyst loading device 3 includes a vertically elongated feeder 10 and a spreader 40 provided to a lower end of the feeder 10.

Feeder 10

The feeder 10 includes a hopper 11, a filter 20, and a pinch valve 30 in the order from a top to a bottom.

The hopper 11 is disposed outside the upper opening of the reactor 1 and configured to store a predetermined amount of the catalyst 2 therein and feed the catalyst 2 to the filter 20 from a lower end of the hopper 11.

Filter 20

The filter 20 has a triple pipe structure of a catalyst pipe 21, an inner pipe 22, and an outer pipe 23. The inner pipe 22 is disposed inside the catalyst pipe 21 in a manner to be concentric with the catalyst pipe 21 and spaced from the catalyst pipe 21. The outer pipe 23 is disposed outside the catalyst pipe 21 in a manner to be concentric with the catalyst pipe 21 and spaced from the catalyst pipe 21.

An upper end of the catalyst pipe 21 is connected to a catalyst outlet of the hopper 11. A lower end of the catalyst pipe 21 is connected to a catalyst inlet of the pinch valve 30. Accordingly, the catalyst 2 fed from the hopper 11 to the pinch valve 30 passes through an inside of the catalyst pipe 21.

The catalyst pipe 21 has a number of communication holes 211 on a part covered with the outer pipe 23. Air can pass through the communication holes 211 between the inside and the outside of the catalyst pipe 21. However, each of the communication holes 211 has a size and a shape for keeping the catalyst 2 from passing therethrough.

The communication holes 211 of the catalyst pipe 21 may be formed by drilling a number of holes in a material for the catalyst pipe 21. Alternatively, the catalyst pipe 21 may be formed of a mesh material and interstices of the mesh material may be defined as the communication holes 211.

The inner pipe 22 has a number of communication holes 221 along an entire length thereof. Air can pass through the communication holes 221 between the inside and the outside of the inner pipe 22. However, each of the communication holes 221 has a size and a shape for keeping the catalyst 2 from passing therethrough.

The communication holes 221 of the inner pipe 22 may be formed by drilling a number of holes in a material for the inner pipe 22. Alternatively, the inner pipe 22 may be formed of a mesh material and interstices of the mesh material may be defined as the communication holes 221.

An upper end of the inner pipe 22 is connected to a dedusting air feed pipe 24.

The dedusting air feed pipe 24 introduces pressured air from an exterior dedusting air feed source (not shown) to the upper end of the inner pipe 22. Dedusting air fed from the inner pipe 22 is introduced into the catalyst pipe 21 through the communication holes 221, passes through the catalyst 2 in the catalyst pipe 21, and is discharged to the outside of the catalyst pipe 21 (i.e., the inside of the outer pipe 23) through the communication holes 211.

When passing through the catalyst 2 in the catalyst pipe 21, the dedusting air collects catalyst powders attached to the catalyst 2 or catalyst powders generated from the catalyst 2 and is discharged together with the collected catalyst powders into the outer pipe 23.

Accordingly, the catalyst 2 passing through the catalyst pipe 21 is discharged to the pinch valve 30 in a clean condition in which the catalyst powders are removed from the catalyst 2 by the dedusting air.

The outer pipe 23 is an airtight pipe along an entire length.

A dedusting air discharge pipe 25 is connected to a lower end portion of the outer pipe 23. The dedusting air discharge pipe 25 is connected to a cyclone 26 for removing dusts.

The dedusting air discharge pipe 25 collects the dedusting air flowed from the catalyst pipe 21 into the outer pipe 23 and discharges the dedusting air to the cyclone 26.

Accordingly, the catalyst powders collected by the dedusting air in the catalyst pipe 21 are collected by the cyclone 26 and are collectively discarded. The delivery air after passing through the cyclone 26 is turned into a clean condition containing no catalyst powders and is subsequently released to the atmosphere.

Pinch Valve 30

The pinch valve 30 serves as a mechanism for switching between a mode for passing the catalyst 2 from the filter 20 to the spreader 40 and a mode for blocking the catalyst 2 from passing.

For this purpose, the pinch valve 30 includes: a valve cylinder 31; a pair of balloons 32 disposed on an inner surface of the valve cylinder 31 in a manner to face each other; and an inflation air feed pipe 33 configured to feed inflation air to the balloons 32.

In the pinch valve 30, the inflation air is fed from the inflation air feed pipe 33 to inflate the pair of balloons 32 (in a condition shown in a solid line in FIG. 2), thereby closing a passage in the valve cylinder 31 to block the catalyst 2 from passing.

On the other hand, when the pinch valve 30 releases the inflation air to the atmosphere, the pair of balloons 32 are deflated (in a condition shown in a chain double-dashed line in FIG. 2), whereby the passage is re-opened to allow the catalyst 2 to pass.

Figure 2:
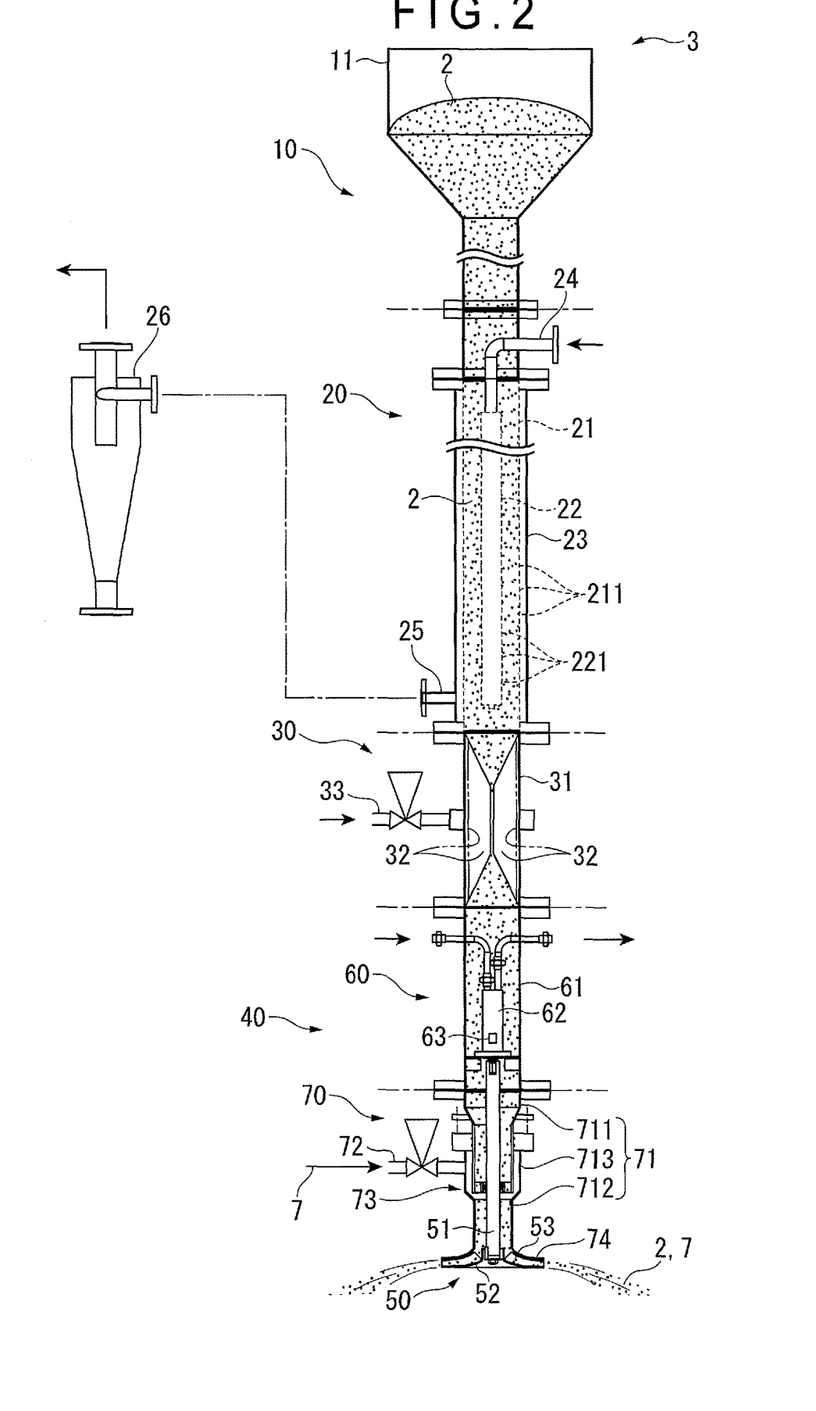

Thus, by deflation and inflation of the balloons 32 using the inflation air, the passing and the blocking of the catalyst 2 can be switched.

Moreover, when the pinch valve 30 is closed, since the passage is closed by the pair of soft balloons 32, even if the catalyst 2 passing when the pinch valve 30 is closed is held between the balloons 32, the catalyst 2 is prevented from being broken to generate catalyst powders.

Spreader 40

Figure 1:
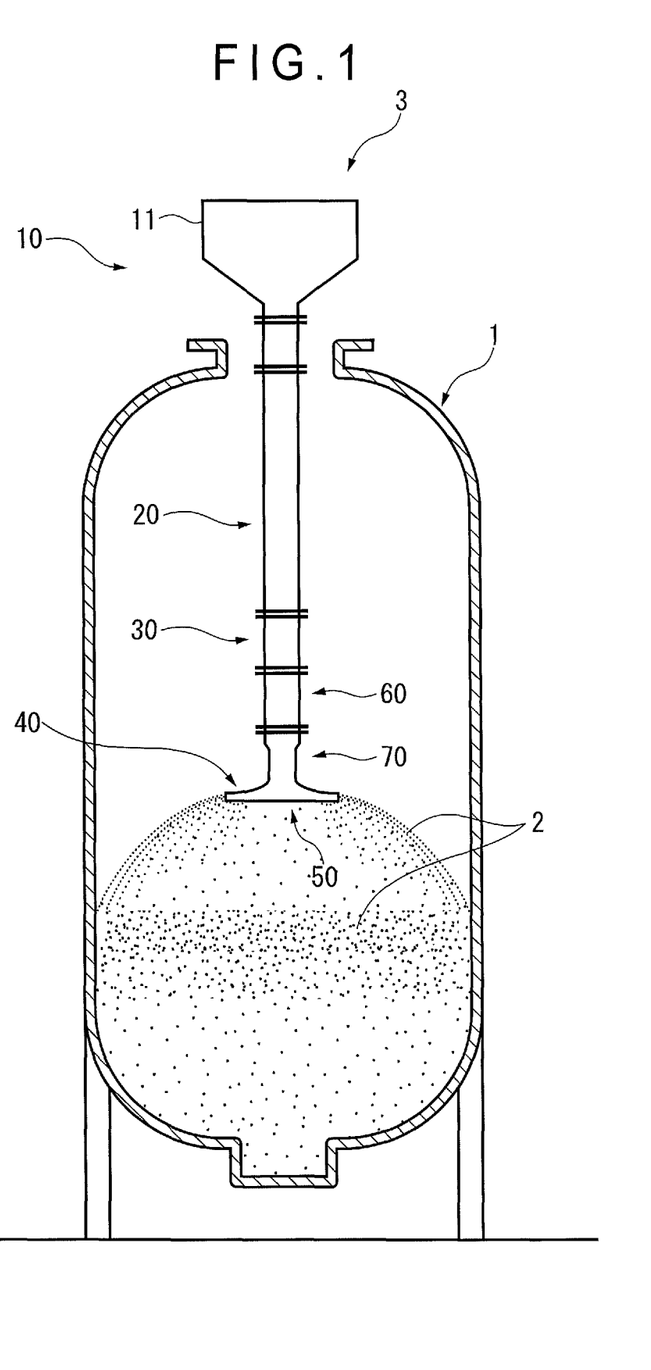

As shown in FIG. 1, the spreader 40 is connected to a lower side of the feeder 10 and configured to rotationally spread the catalyst 2 fed from the feeder 10 inside the reactor 1.

Figure 3:
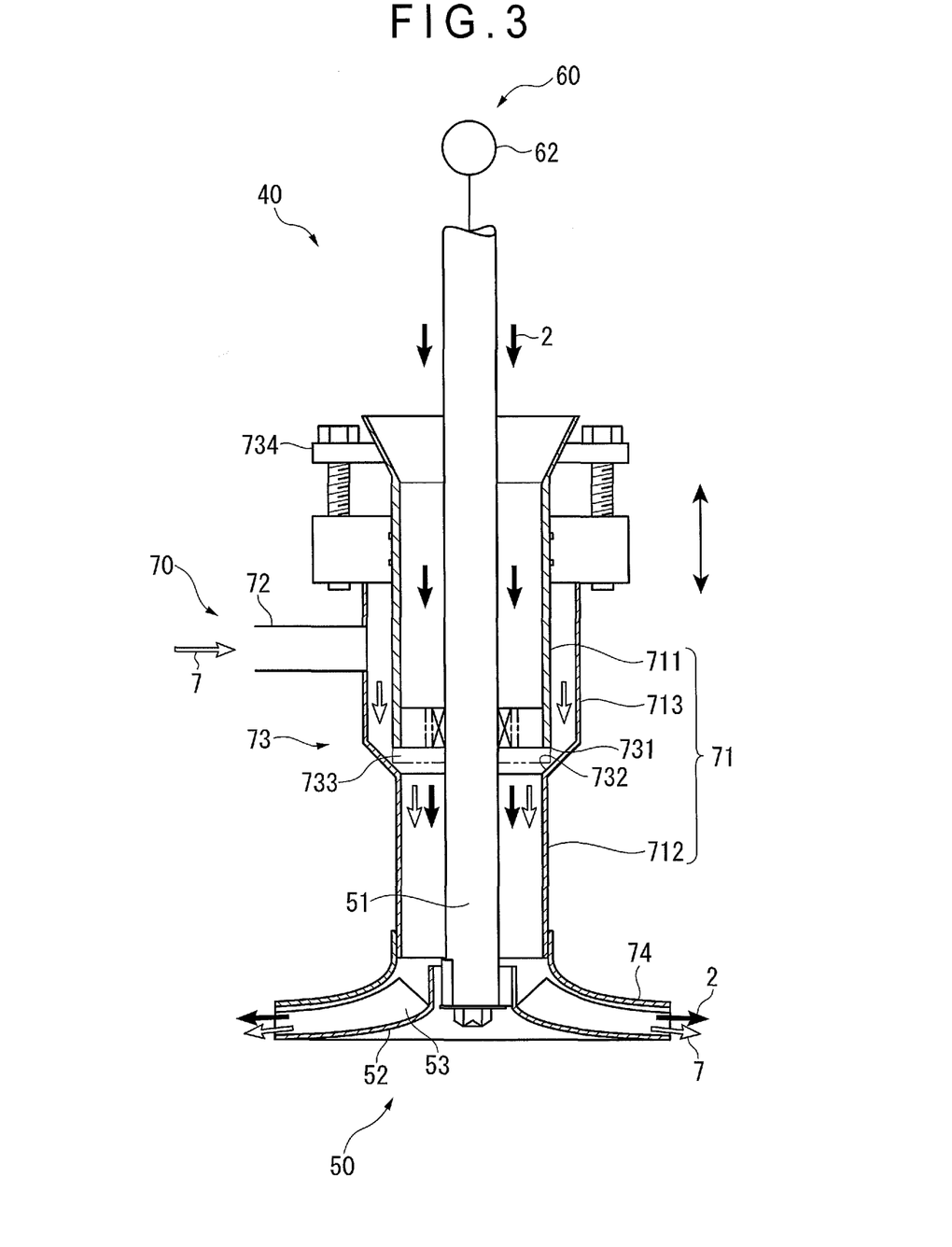

For this purpose, as shown in FIGS. 2 and 3, the spreader 40 includes: a rotor 50 for spreading, a drive portion 60 configured to rotate the rotor 50; and an air delivery unit 70 configured to air-deliver the catalyst 2 to be spread by the rotor 50.

Rotor 50

As shown in FIGS. 2 and 3, the rotor 50 includes a shaft 51 disposed concentrically with the feeder 10; and a bottom plate 52 fixed to a lower end of the shaft 51. A number of partitions 53 are vertically provided on an upper surface of the bottom plate 52 in a manner to extend from the central part of the bottom plate 52 to an outer circumference thereof.

Figure 4:
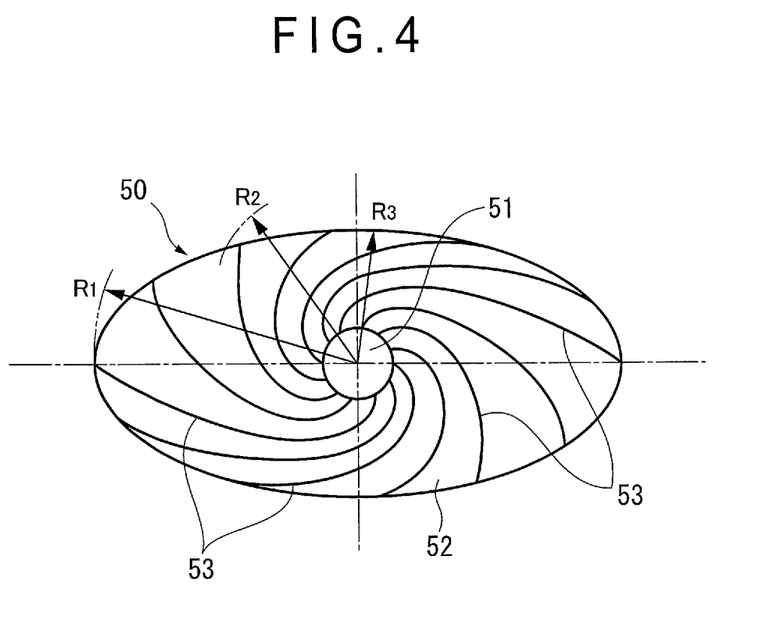
Figure 5:
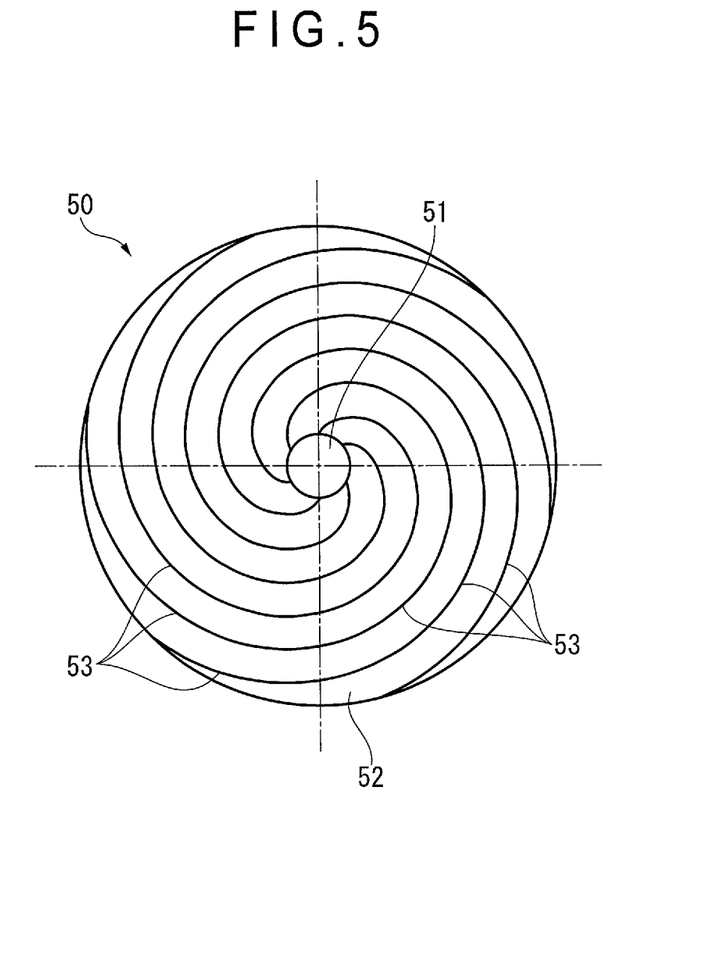

As shown in FIG. 4, a planar shape of the bottom plate 52 is elliptical.

The partitions 53 are curved in a volute and extend to the outer circumference of the bottom plate 52 while a side of each of the partitions 53 near the center of the bottom plate 52 is connected to the shaft 51.

Since the bottom plate 52 is elliptical, a radius (i.e., a distance from the center of the bottom plate 52) of each of the partitions 53 is varied depending on a portion of the bottom plate 52.

Specifically, among the partitions 53, a partition 53 having an end reaching the outer circumference in a long axis direction of the bottom plate 52 has a maximum radius R1 and a partition 53 having an end reaching the outer circumference in a short axis direction of the bottom plate 52 has a minimum radius R3. A radius R2 of each of the partitions 53 provided between the above partitions 53 is a value between R1 and R3 (R1>R2>R3).

In such a rotor 50, since the radius to the outer circumference of the bottom plate 52 differs depending on directions, the catalyst 2 discharged along each of the partitions 53 has a spread speed in a circumferential direction according to each of the radial directions, so that the catalyst 2 is broadly spread inside the reactor 1.

Drive Portion 60

As shown in FIGS. 2 and 3, the drive portion 60 includes: a drive portion cylinder 61; and an air motor 62 and a tachometer 63 that are provided inside the drive portion cylinder 61.

The drive portion cylinder 61 is connected to a lower end of the valve cylinder 31 of the pinch valve 30.

The air motor 62 is supported at the center position of the drive portion cylinder 61. A main shaft (not shown) of the air motor 62 is connected to the shaft 51 of the rotor 50.

The main shaft of the air motor 62 can be rotated by drive air fed from the outside, thereby rotating the rotor 50.

The tachometer 63 is annexed to the air motor 62 and is configured to detect a rotation speed of the main shaft of the air motor 62 and output a signal to an exterior controller.

Air Delivery Unit 70

The air delivery unit 70 is provided between the drive portion 60 and the rotor 50 and is configured to air-deliver the catalyst 2, which is fed through the drive portion 60 from the feeder 10, to the rotor 50.

For this purpose, the air delivery unit 70 includes: a cylinder 71 connected to a lower end of the drive portion 60; a delivery air feed pipe 72 configured to feed a delivery air 7 to the cylinder 71; a throttle mechanism 73 configured to regulate a flow amount or a pressure of the delivery air to be fed; and a rotor cover 74 for keeping air flow along an upper surface of the rotor 50.

The cylinder 71 includes an upper cylinder 711 and a lower cylinder 712 extending downward from the upper cylinder 711.

The upper cylinder 711 is connected to a lower end of the drive portion cylinder 61. The catalyst 2 is fed from the feeder 10 into the upper cylinder 711.

The lower cylinder 712 includes: a step 732 at an upper portion; and a large diameter portion 713 connected to the step 732. A diameter of the lower cylinder 712 is substantially the same as that of the upper cylinder 711. A diameter of the large diameter portion 713 is larger than that of the upper cylinder 711.

The upper cylinder 711 is inserted from the above into the large diameter portion 713. A gap is kept between an inner surface of the large diameter portion 713 and an outer surface of the upper cylinder 711.

A lower end 731 of the upper cylinder 711 is disposed facing the step 732 of the lower cylinder 712. An entirely circumferentially continuous slit 733 is formed between the lower end 731 and the step 732.

The lower cylinder 712 is suspended with a bolt 734 provided at an outer circumference of an upper portion of the upper cylinder 711. An opening area of the slit 733 can be adjusted by rotating the bolt 734 to adjust the respective heights of the lower cylinder 712 and the upper cylinder 711 relative to each other.

The delivery air feed pipe 72 is connected to the large diameter portion of the lower cylinder 712 and configured to feed the delivery air 7 into an inside of the large diameter portion of the lower cylinder 712 (i.e., an outside of the upper cylinder 711). The fed delivery air 7 flows through the slit 733 into a small diameter portion of the lower cylinder 712. At this time, the catalyst 2 also flows from the upper cylinder 711 into the small diameter portion of the lower cylinder 712.

Accordingly, in the small diameter portion of the lower cylinder 712, the catalyst 2 is dispersed in the delivery air 7 and air-delivered to the rotor 50 disposed under the lower cylinder 712. In this arrangement, an air delivery condition can be altered by adjusting the opening of the slit 733 using the throttle mechanism 73.

A lower end of the lower cylinder 712 is fixed to the rotor cover 74.

A planar shape of the rotor cover 74 is circular. A diameter thereof is set to match the maximum diameter of the rotor 50. Moreover, the rotor cover 74 is formed in a curve along upper edges of the partitions 53 of the rotor 50.

The delivery air 7 can be increased when the slit 733 is enlarged using the throttle mechanism 73, in other words, when the lower cylinder 712 is lowered with respect to the upper cylinder 711.

At this time, the rotor cover 74 reaches near the upper edges of the partitions 53. It should be noted that the rotor cover 74 and the partitions 53 are brought into contact with each other in order to allow the rotor 50 be rotatable with respect to the fixed rotor cover 74.

In the above state, in the rotor 50, a plurality of cylindrical passages extending from the center toward an outer circumference are defined between the partitions 53. The catalyst 2 is air-delivered by the delivery air 7 through the passages.

When the slit 733 is narrowed by the throttle mechanism 73, in other words, when the lower cylinder 712 is lifted upward, the delivery air 7 can be decreased.

At this time, a large gap is present between the rotor cover 74 and the upper edges of the partitions 53. In the above state, in the rotor 50, spaces between the partitions 53 are mutually in communication, but the catalyst 2 is mainly delivered along the bottom plate 52 by the delivery air 7, so that the catalyst 2 can be spread along each of the passages between the partitions 53.

Advantage(s) of Embodiment(s)

In the above exemplary embodiment, advantages described below are obtainable.

In the exemplary embodiment, the catalyst 2 is fed from the feeder 10 to the rotor 50 and rotationally spread from the rotor 50 into the reactor 1. At this time, the air flow of the delivery air 7 along the catalyst 2 fed from the rotor 50 is formed by the air delivery unit 70, so that the catalyst 2 is delivered in the delivery air 7 to the rotor 50 and discharged together with the delivery air 7 into the reactor 1.

Thus, according to the exemplary embodiment, the delivery of the catalyst 2 in the delivery air 7 can prevent mutual friction of the catalyst 2 caused when only the catalyst 2 is delivered and can prevent breakage of the catalyst 2 and generation of catalyst powders caused by the mutual friction.

Thus, in the exemplary embodiment, the influence by the catalyst powders is avoidable by inhibiting the generation of the catalyst powders.

In the exemplary embodiment, the rotor 50 is disposed to the lower end of the cylinder 71 that is concentric with the rotary shaft of the rotor 50. The cylinder 71 is attached with the delivery air feed pipe 72 configured to generate the air flow of the delivery air 7 and the throttle mechanism 73 configured to regulate the delivery air 7 from the delivery air feed pipe 72.

Thus, according to the exemplary embodiment, in the spreader 40, such suitable delivery conditions of the catalyst 2 as not generating the catalyst powders can be set by regulating the flow amount, flow speed or pressure of the delivery air 7 for air-delivering the catalyst 2.

In the exemplary embodiment, the cylinder 71 includes the upper cylinder 711 and the lower cylinder 712 which are disposed concentrically with each other and are partially superposed on each other. The slit 733 is formed between the step 732 of the lower cylinder 712 and the lower end 731 of the upper cylinder 711. The throttle mechanism 73 is configured to narrow the flow of the delivery air 7 using the slit 733. The bolt 734 is rotated to relatively move the lower cylinder 712 and the upper cylinder 711 in respective axis directions.

Thus, according to the exemplary embodiment, the opening area of the slit 733 can be adjusted by relatively adjusting the heights of the lower cylinder 712 and the upper cylinder 711. The throttle mechanism 73 for regulating the delivery air 7 can be provided by adjusting an opening degree of the slit 733. Accordingly, the throttle mechanism 73 can be obtained with a simple structure.

In the exemplary embodiment, a planar shape of the bottom plate 52 of the rotor 50 is elliptical and a radius from the rotary shaft to the outer circumference at each portion of the bottom plate 52 differs depending on the directions starting from the rotary shaft.

Accordingly, the passages of the catalyst 2 along the partitions 53 can be altered in radius depending on the directions starting from the rotary shaft.

In such a rotor 50, the radius to the outer circumference at each portion depends on discharge positions of the catalyst 2 and a circumferential speed of the rotor 50 at each portion differs, so that a difference between flying distances in the radius directions of the catalyst 2 spread from each portion becomes large. Consequently, the catalyst 2 spread from each portion of the rotor 50 can be dispersed in a broad range inside the reactor 1, so that a less deviated and even spread condition of the catalyst 2 can be obtained.

In the exemplary embodiment, the rotor 50 includes a plurality of partitions 53 that are continuous to the outer circumference from the center and vertically formed on the upper surface of the bottom plate 52. The rotor cover 74 covering the upper edges of the partitions 53 is provided to the rotor 50.

With this arrangement, in the rotor 50, the fed catalyst 2 is guided from the central part of the rotor 50 to the outer circumference thereof by the bottom plate 52 and the partitions 53, so that the catalyst 2 can be spread into the reactor 1 from each portion on the outer circumference of the rotor 50.

At this time, since the upper edges of the partitions 53 are covered with the rotor cover 74, the bottom plate 52 and the partitions 53 of the rotor 50 and the rotor cover 74 define the cylindrical passages of the catalyst. With this arrangement, the delivery air 7 fed together with the catalyst 2 does not dissipate, so that the catalyst 2 can be securely air-delivered to the outer circumference of the rotor 50.

In the exemplary embodiment, the pinch valve 30 is provided to the feeder 10 and configured to block the passage of the catalyst 2 reaching the rotor 50 through an inside of the valve cylinder 31. The pinch valve 30 is provided by the pair of balloons 32 disposed inside the valve cylinder 31 in a manner to face each other.

Thus, according to the exemplary embodiment, feed and spread of the catalyst 2 can be suspended or continued using the pinch valve 30. Moreover, since the pinch valve 30 is in the form of balloons, even if the catalyst 2 is trapped by the balloons when blocking the passage, the balloons 32 are deformed to softly hold the catalyst 2 and not break the catalyst 2, so that generation of the catalyst powders is preventable.

In the exemplary embodiment, the filter 20 for cleaning the catalyst 2 to enter the rotor 50 and removing dust is provided in the feeder 10.

Particularly, the filter 20 is configured so that, when the dedusting air is fed from the dedusting air feed pipe 24 into the inner pipe 22, the fed dedusting air enters the catalyst pipe 21 through the communication holes 221 of the inner pipe 22 and further enters the outer pipe 23 through the communication holes 211 of the catalyst pipe 21 to be discharged into the dedusting air discharge pipe 25, resulting in collection of dust by the cyclone 26.

Accordingly, in the filter 20, the catalyst 2 is cleaned with the dedusting air entering the outer pipe 23 through the inner pipe 22 and the catalyst pipe 21 by delivering the catalyst 2 fed to the rotor 50 to between the catalyst pipe 21 and the inner pipe 22, so that the catalyst powders attached to the catalyst 2 are discharged together with the dedusting air into the outer pipe 23 and the dedusting air discharge pipe 25 and are collected by the cyclone 26.

With such a filter 20, even when catalyst powders are already attached to or mixed with the catalyst 2 before being fed from the hopper 11, the catalyst powders are removable.

Thus, according to the exemplary embodiment, in addition to the prevention of breakage of the catalyst 2 caused by the air delivery and the inhibition of generation of the catalyst powders, influence by the catalyst powders is avoidable by removing the catalyst powders attached to or mixed with the catalyst 2.

Modification(s)

It should be understood that the scope of the present invention is not limited to the above-described exemplary embodiment(s) but includes modifications and improvements as long as the modifications and improvements are compatible with the invention.

In the exemplary embodiment, although the planar shape of the bottom plate 52 of the rotor 50 is elliptical, the bottom plate 52 of the rotor 50 may be formed in any shape.

As shown in FIG. 5, the planar shape of the bottom plate 52 of the rotor 50 may be circular.

In such a rotor 50, the respective dimensions of the partitions 53 having the respective ends at the outer circumference of the bottom plate 52 are all the same radius of the bottom plate 52. Accordingly, a reaching range of the catalyst 2 spread from the rotor 50 is limited to a predetermined radius region of the reactor 1. However, the spread range is alterable by adjusting the rotation speed of the rotor 50, which is suitable for a case where it is a main target to spread the catalyst in a specific range.

Although the rotor cover 74 is fixed to the lower cylinder 712 in the exemplary embodiment, the rotor cover 74 may be fixed to the upper edges of the partitions 53 to be rotated together with the rotor 50.

In short, it is only necessary to securely deliver the catalyst 2 air-delivered by the delivery air 7 to the outer circumference of the rotor 50 by covering the upper side of the partitions 53.

The partitions 53 are not necessarily curved in a planar shape, but may linearly extend outward from the central part of the rotor 50. It should be noted that, as described above with reference to FIGS. 4 and 5, with the partitions 53 formed in a volute, it is easy to tangentially scatter the catalyst 2 to be spread and it is effective to prevent the catalyst 2 from being broken when the catalyst 2 is spread.

The throttle mechanism 73 is not necessarily activated by manually operating the bolt 734, but may be driven by a motor. Alternatively, the large diameter portion 713 and the lower cylinder 712 may be raised or lowered by an air cylinder and the like with respect to the upper cylinder 711.

In addition to the opening and closing of the slit 733, the throttle mechanism 73 may also be provided in a form of a throttle valve in the delivery air feed pipe 72.

When such a throttle valve is employed, the delivery air feed pipe 72 may feed the delivery air 7 into the upper cylinder 711.

A driving source of the drive portion 60 is not limited to the air motor 62 but may be an electric motor, a hydraulic motor and the like. Moreover, the air motor 62 (the driving source) is not necessarily provided inside the drive portion cylinder 61. For instance, the driving source may be set outside the drive portion cylinder 61 so as to drive the shaft 51 inside of the drive portion cylinder 61 through a transmission mechanism.

The pinch valve 30 is not necessarily provided by the balloons 32, but may be provided by a shutter made of an elastomer material and configured to block the valve cylinder 31.

The opening and closing the feeder 10 is not necessarily conducted by the pinch valve 30, but may be conducted by other valve mechanisms. For instance, a ball valve, a shutter, or the like may replace the pinch valve 30, as long as the flow of the catalyst 2 in the valve cylinder 31 can be blocked or restricted.

The structure of the filter 20 is not limited to the triple pipe structure including the catalyst pipe 21, the inner pipe 22 and outer pipe 23 and in which the dedusting air passes through from the inside to the outside, but may be a structure in which the dedusting air passes through in one direction from one side of a catalyst cylinder to the other side. When a small amount of the catalyst powders is mixed with the catalyst 2 to be fed from the hopper 11, the filter 20 may be omitted.

What is claimed is:

1. A catalyst loading device configured to rotationally spread a catalyst in a reactor, the catalyst loading device comprising:
   a rotor disposed in the reactor and configured to be rotated;
   a feeder configured to feed the catalyst into the rotor; and
   an air delivery unit configured to generate an air flow along the catalyst fed to the rotor.

2. The catalyst loading device according to claim 1, wherein
   the rotor is disposed to a lower end of a cylinder that is concentric with a rotary shaft of the rotor, and
   the cylinder comprises: a delivery air feed pipe configured to generate the air flow; and a throttle mechanism configured to regulate the air flow fed from the delivery air feed pipe.

3. The catalyst loading device according to claim 2, wherein
   the cylinder comprises an upper cylinder and a lower cylinder that are disposed concentrically with each other and are partially superposed on each other,
   the cylinder comprises a slit formed between a step formed on one of the upper cylinder and the lower cylinder and an edge of the other of the upper cylinder and the lower cylinder, and
   the throttle mechanism comprises the slit and configured to adjust an opening degree of the slit by relatively moving the upper cylinder and the lower cylinder in respective shaft directions.

4. The catalyst loading device according to claim 1, wherein
   the rotor is shaped to have a radius from the rotary shaft to an outer circumference differing depending on directions starting from the rotary shaft.

5. The catalyst loading device according to claim 1, wherein
   the rotor comprises: a bottom plate; partitions vertically formed on an upper surface of the bottom plate and are continuous from a central part of the bottom plate to an outer circumference thereof; and a rotor cover that covers upper edges of the partitions.

6. The catalyst loading device according to claim 1, wherein
   the feeder comprises a pinch valve configured to block a passage of the catalyst reaching the rotor, the pinch valve comprising a pair of balloons disposed to face each other.

7. The catalyst loading device according to claim 1, wherein
   the feeder comprises a filter in the passage of the catalyst reaching the rotor,
   the filter comprises: a catalyst pipe through which the catalyst passes; an inner pipe disposed inside the catalyst pipe in a manner to be concentric with the catalyst pipe; and an outer pipe disposed outside the catalyst pipe in a manner to be concentric with the catalyst pipe,
   the catalyst pipe comprises a number of communication holes through which an inside of the catalyst pipe intercommunicates with an outside thereof,
   the inner pipe is connected to a dedusting air feed pipe configured to feed dedusting air into an inside of the inner pipe and comprises a number of communication holes through which the inside of the inner pipe intercommunicates with an outside thereof, and
   the outer pipe is connected to a dedusting air discharge pipe configured to discharge the dedusting air in an inside of the outer pipe to an outside of the outer pipe.

8. A catalyst loading method for spreading a catalyst inside a reactor using a catalyst loading device of a rotary type, the method comprising:
   feeding the catalyst into a rotor rotating in the reactor; and
   generating an air flow along the catalyst fed to the rotor to air-deliver the catalyst.

* * * * *

UNITED STATES PATENT AND TRADEMARK OFFICE
CERTIFICATE OF CORRECTION

PATENT NO. : 9,586,189 B2  
APPLICATION NO. : 15/041091  
DATED : March 7, 2017  
INVENTOR(S) : Katsuhiko Kawakami et al.

Page 1 of 1

It is certified that error appears in the above-identified patent and that said Letters Patent is hereby corrected as shown below:

On the Title Page

Item (73) Assignee:  
Change "SOFT AND INDUSTRIES CO., LTD.," to --SOFTARD INDUSTRIES CO., LTD.,--.

Signed and Sealed this  
Thirtieth Day of May, 2017

Michelle K. Lee  
*Director of the United States Patent and Trademark Office*